US009232121B2

(12) United States Patent
Ovsiannikov (10) Patent No.: US 9,232,121 B2
(45) Date of Patent: Jan. 5, 2016

(54) IMAGE SENSOR DEFECT IDENTIFICATION USING BLURRING TECHNIQUES

(71) Applicant: Micron Technology, Inc., Boise, ID (US)

(72) Inventor: Ilia Ovsiannikov, Studio City, CA (US)

(73) Assignee: Micron Technology, Inc., Boise, ID (US)

( * ) Notice: Subject to any disclaimer, the term of this patent is extended or adjusted under 35 U.S.C. 154(b) by 135 days.

(21) Appl. No.: 14/036,939

(22) Filed: Sep. 25, 2013

(65) Prior Publication Data

US 2014/0092279 A1 Apr. 3, 2014

Related U.S. Application Data

(63) Continuation of application No. 11/514,531, filed on Aug. 31, 2006, now abandoned.

(51) Int. Cl.
*H04N 7/18* (2006.01)
*H04N 5/217* (2011.01)
*H04N 5/367* (2011.01)
*H04N 17/00* (2006.01)

(52) U.S. Cl.
CPC .......... *H04N 5/2176* (2013.01); *H04N 5/3675* (2013.01); *H04N 17/002* (2013.01)

(58) Field of Classification Search
CPC ..................................................... H04N 5/2176
USPC ......................................................... 348/126
See application file for complete search history.

(56) References Cited

U.S. PATENT DOCUMENTS

| 6,144,778 A | 11/2000 | Beauchamp et al. |
| 6,377,702 B1 | 4/2002 | Cooper |
| 6,683,643 B1 * | 1/2004 | Takayama et al. ............ 348/247 |
| 7,183,532 B2 | 2/2007 | Gunn |
| 7,613,329 B2 | 11/2009 | Grewal et al. |
| 2002/0080253 A1 * | 6/2002 | Kim .............................. 348/246 |

(Continued)

FOREIGN PATENT DOCUMENTS

| EP | 0986249 A2 | 3/2000 |
| EP | 1261197 A1 | 11/2002 |

(Continued)

OTHER PUBLICATIONS

"International Application Serial No. PCT/US2007/019075, Search Report mailed Jun. 30, 2008", 4 pgs.

(Continued)

*Primary Examiner* — Richard Torrente
(74) *Attorney, Agent, or Firm* — Schwegman Lundberg & Woessner, P.A.

(57) ABSTRACT

Embodiments described herein may operate to image a scene with an imaging system using an image blurring technique. An image sensor array (ISA) element may be identified as a dark defect element if a first ratio of an average of a set of illuminance signal magnitudes from a set of surrounding ISA elements to a magnitude of an illuminance signal from the ISA element is greater than a threshold sharpness value. The image sensor array element may be identified as a bright defect element if a second ratio of the magnitude of the illuminance signal from the ISA element to the average of the set of illuminance signal magnitudes from the set of surrounding ISA elements is greater than the threshold sharpness value.

16 Claims, 7 Drawing Sheets

(56) References Cited

U.S. PATENT DOCUMENTS

| | | |
|---|---|---|
| 2003/0133027 A1 | 7/2003 | Itoh |
| 2004/0189836 A1 | 9/2004 | Spears et al. |
| 2005/0010621 A1 | 1/2005 | Pinto et al. |
| 2005/0285952 A1 | 12/2005 | Kwon et al. |
| 2007/0195179 A1 | 8/2007 | Glenn et al. |
| 2008/0055434 A1 | 3/2008 | Ovsiannikov |
| 2008/0055601 A1 | 3/2008 | Ovsiannikov |
| 2008/0218610 A1 | 9/2008 | Chapman et al. |

FOREIGN PATENT DOCUMENTS

| | | |
|---|---|---|
| TW | 453110 B | 9/2001 |
| TW | 501365 B | 9/2002 |
| TW | I220360 B | 8/2004 |
| TW | I363179 | 5/2012 |
| WO | WO-2008027475 A2 | 3/2008 |
| WO | WO-2008027475 A3 | 8/2008 |

OTHER PUBLICATIONS

"International Application Serial No. PCT/US2007/019075, Written Opinion mailed Jun. 30, 2008", 6 pgs.

"Taiwanese Application Serial No. 096131720, Office Action mailed Aug. 15, 2011", 8 pgs.

"Taiwanese Application Serial No. 096131720, Response filed Nov. 14, 2011 to Office Action mailed Aug. 15, 2011", 3 pgs.

* cited by examiner

FIG. 5C

IMAGE SENSOR DEFECT IDENTIFICATION USING BLURRING TECHNIQUES

PRIORITY APPLICATION

This application is a continuation of U.S. application Ser. No. 11/514,531, filed Aug. 31, 2006, which is incorporated herein by reference in its entirety.

TECHNICAL FIELD

Various embodiments described herein relate to apparatus, systems, and methods associated with imaging and image sensor arrays, including the detection of sensor defects.

BACKGROUND INFORMATION

Image sensors are widely used in a variety of consumer electronic devices, including digital cameras and cellular telephones with built-in digital cameras. An image sensor may comprise a matrix of sensor elements. If one or more sensor elements are defective or occluded, this condition may degrade image quality.

Sensor elements may include "bright defects" and "dark defects," perhaps causing them to be unusable. Some bright and dark defects may be of a "stuck pixel" variety. That is, an output signal from a stuck sensor element may register a fixed signal level regardless of the brightness of light incident to the element. The terms "defective element" and "unusable element" are used interchangeably herein. "Brightness of light" may hereinafter be referred to using the more precise term "illuminance." Units of lux, or lumens per square meter, may be used as a measure of illuminance.

An image sensor may convert light to analog sensor element output signals. An analog to digital converter (ADC) may convert the sensor element output signals to a digital format. A least significant bit (LSB) associated with the ADC may establish a granularity with which illuminance sensed by the sensor element may be measured. Thus, in the field of digital imaging, illuminance may also be expressed in LSB units.

A dark defect may also result from a dust particle lodged against the sensor element, blocking some or all of the light that might otherwise impinge on the element. If all light is blocked, the sensor element output signal may remain fixed as the illuminance incident to the sensor element changes. If the incident light is only partially blocked, and the partially-blocked sensor element is not stuck, the element output signal may vary as the incident illuminance varies. In the latter case, however, the output signal may not be as large as if the sensor element were not partially blocked.

Some methods are available to identify unusable sensor elements at a production facility following fabrication. For example, each production sensor may be tested and calibrated under controlled conditions. Such methods may incur substantial cost, and may fail to identify dark defects resulting from dust particles.

Consider, for example, a cellular telephone with a built-in camera. The camera sensor may have been tested and calibrated at the semiconductor manufacturing facility, following fabrication and before shipment to a cellular telephone manufacturer. During camera module assembly, a dust particle inside the camera module may break free and land on the surface of one or more sensor elements. The resulting dark defect may subsequently manifest itself as a cluster of dark pixels on captured images. Thus, there is a need to identify and rectify such defects.

DETAILED DESCRIPTION

Figure 1:
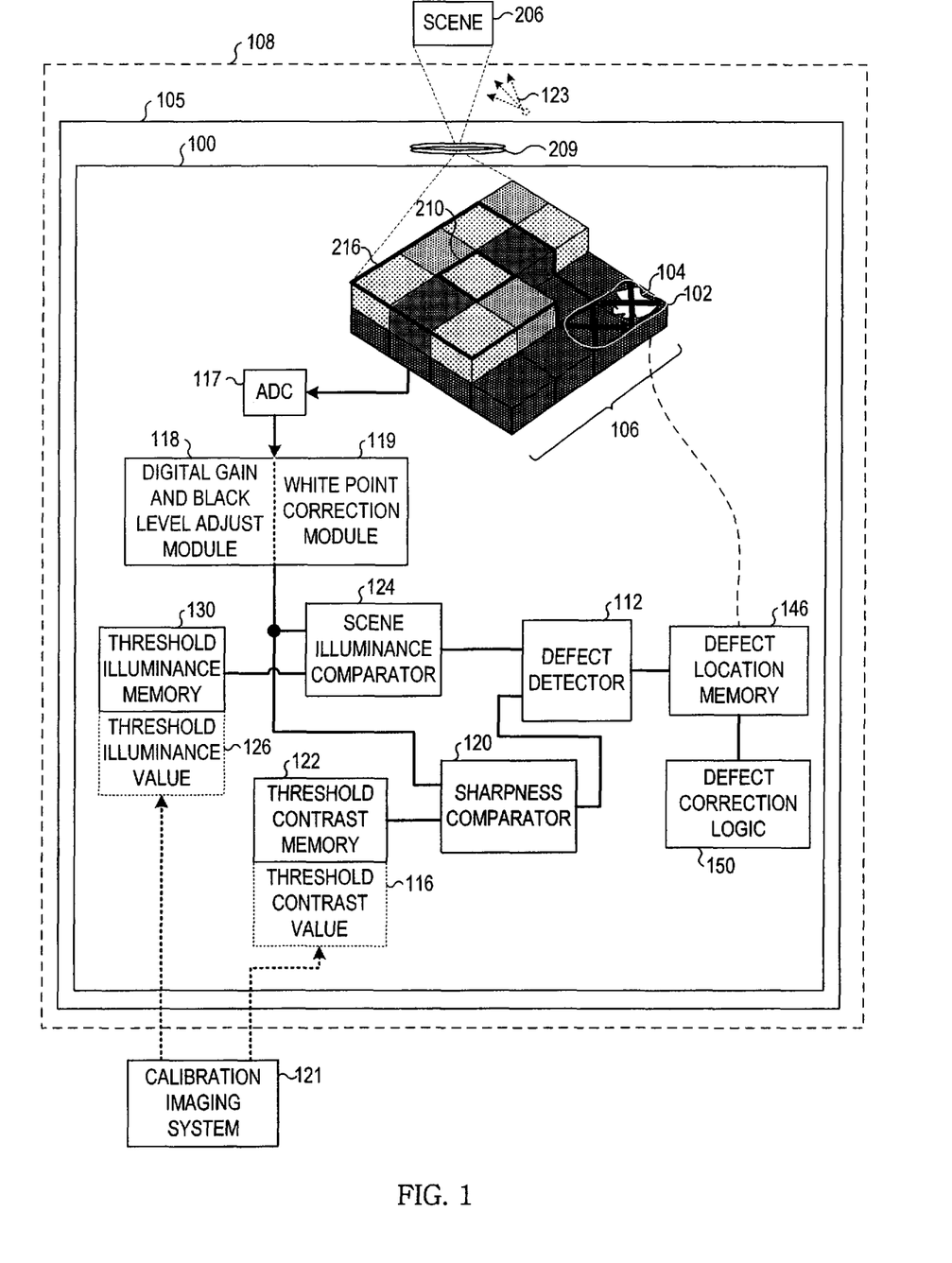
FIG. 1 is a block diagram of an apparatus according to various embodiments of the invention.

FIG. 1 is a block diagram of an apparatus 100 according to various embodiments of the invention. Many of the embodiments described herein may operate to automatically identify one or more unusable image sensor array (ISA) elements 102, including clusters thereof.

An unusable ISA element 102 may be of a stuck pixel variety, characterized by an output level that is unchanging as the illuminance incident to the stuck pixel changes, as previously described. A stuck pixel ISA element may comprise a bright defect or a dark defect. A darkly defective ISA element that is not of the stuck pixel variety may be occluded by dust particles (e.g., a dust particle 104). The dust particle 104 may fall on and lodge adjacent to the darkly defective ISA element. This may occur during or after assembly of a digital camera or other imaging system containing an ISA, such as an imaging system 105 comprising an ISA 106, for example. Unusable ISA elements may often be compensated if their position in the sensor matrix is known. Thus, the identification and remediation of the unusable elements may increase customer satisfaction by increasing image quality. Product costs may also be reduced as the number of defective product returns decreases.

Although some embodiments may be described herein in the context of a digital camera, many embodiments of the invention can be realized in other image sensor-based apparatus, systems, and applications, including cellular telephones, hand-held computers, laptop computers, desktop computers, automobiles, household appliances, medical equipment, point-of-sale equipment, and image recognition equipment, among others, collectively shown as a system 108.

Figure 2:
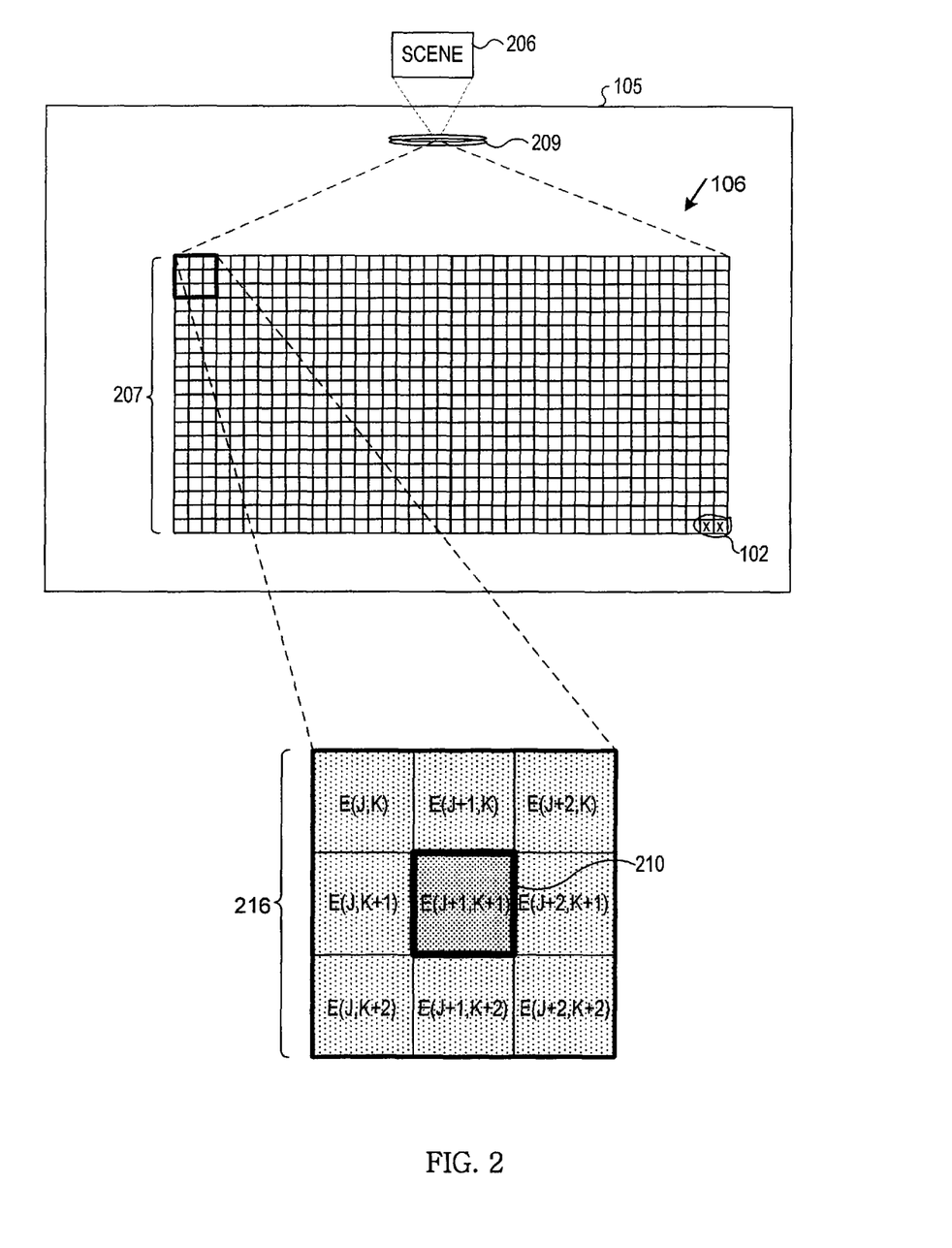
FIG. 2 is a schematic diagram of an image sensor array (ISA) according to various embodiments of the invention.

FIG. 2 is a schematic diagram of the ISA 106 according to various embodiments of the invention. Some embodiments herein may operate to detect unusable sensor elements as those corresponding to pixels that remain in sharp focus in an image of a scene 206 captured using an image blurring technique. A lens 209 associated with the imaging system 105 may be defocused, for example, to create a blurred image. Other techniques may be used, including increasing exposure time to enhance the effect of camera movement (e.g., handshake) relative to the scene 206. An increase in exposure time may optionally be accompanied by a decrease in lens aperture, to maintain a constant exposure. The blurring technique may spread light from the scene 206 more evenly across the ISA 106 than would be the case with focused image capture. That is, optical contrast between the elements 207 of the ISA 106 may be decreased as a result of the blurring.

Each ISA element 207 may register a brightness value that is closer to brightness values registered by neighboring ISA elements than would be the case if the image were focused. However, an unusable ISA element, including the unusable ISA elements 102, for example, may be stuck at a constant output value, or may register a reduced output due to occlusions. As a result, the unusable ISA elements 102 may not register the contrast-reducing effect caused by the image blurring technique. The unusable ISA element 102 may thus "stand out" from other elements and may be identified using this characteristic.

Image sharpness may be measured as the rate of change of the brightness gradient across a set of adjacent pixels containing lighter and darker image features. It is thus noted that "brightness ratio," "contrast ratio," and "sharpness" are all intended to mean a first illuminance value divided by a second illuminance value.

Some embodiments may operate to scan the blurred, captured image to locate and identify the unusable ISA elements 102. An ISA element 210 may be selected for testing during the scanning process. The brightness value registered by the selected ISA element 210 may be compared to an average brightness of a set of surrounding ISA elements 216. Some embodiments may calculate a ratio of the brighter of these values to the other (i.e., the one that is less bright). The resulting contrast ratio may be compared to a threshold contrast value to determine whether the selected ISA element 210 is unusable. Although the set of surrounding ISA elements 216 is shown in FIG. 2 as immediately adjacent elements, some embodiments may utilize other element subsets of the ISA 106 as the set of surrounding ISA elements 216. For example, in an ISA equipped with a color filter array, the surrounding elements may comprise nearby surrounding ISA elements of the same color as the ISA element 210.

Turning back to FIG. 1, the apparatus 100 may include a defect detector 112 in the imaging system 105. The defect detector 112 may test the selected ISA element 210 using a blurred image of the scene 206. The defect detector 112 may identify the selected ISA element 210 as unusable if a contrast ratio between an illuminance indicated by the selected ISA element 210 and an average illuminance indicated by the set of surrounding ISA elements 216 is greater than a threshold contrast value 116.

In some embodiments, the average illuminance value may be calculated by summing illuminance values from each element in the set of surrounding ISA elements 216 and dividing the resulting sum by the unit quantity (i.e., number) of ISA elements in the set of surrounding ISA elements 216. Some embodiments, on the other hand, may calculate the average illuminance value using other sub-sets of ISA elements from the ISA 106.

Some embodiments herein may use signal outputs from ISA elements as an indirect measure of an illuminance incident to each respective ISA element. Thus, the illuminance indicated by the selected ISA element 210 may correspond to a magnitude of an illuminance signal from the selected ISA element 210. Likewise, the illuminance indicated by the set of surrounding ISA elements 216 may correspond to an average of a set of illuminance signal magnitudes from the set of surrounding ISA elements 216.

The apparatus 100 may also include an ADC 117 coupled to the ISA 106. The ADC 117 may digitize illuminance signals from the ISA 106.

A digital gain and black level adjustment module 118 may be coupled to the ADC 117. The digital gain and black level adjustment module 118 may perform a black level calibration on a digitized illuminance signal from the selected ISA element 210. The adjustment may be performed such that the digitized illuminance signal from the selected ISA element 210 corresponds to a level of zero illuminance when no light is incident to the selected ISA element 210.

A white point correction module 119 may be coupled to the ADC 117. The white point correction module 119 may normalize the digitized illuminance signal from the ISA element by removing a color cast introduced by illuminating the scene 206 using light of a particular color temperature. Achromatic images may appear gray rather than tinted in a captured image as a result of the white point correction operation.

The apparatus 100 may also include a sharpness comparator 120 coupled to the defect detector 112. The sharpness comparator 120 may calculate a contrast ratio associated with the magnitude of the illuminance signal from the ISA element and with the average of the set of illuminance signal magnitudes from the set of surrounding ISA elements. The sharpness comparator 120 may also compare the resulting contrast ratio to the threshold contrast value 116.

The threshold contrast value 116 may comprise a constant value associated with a design of the imaging system 105. The threshold contrast value 116 may have been previously derived by a calibration imaging system 121. In some embodiments, the calibration imaging system 121 may be external to the imaging system 105. The threshold contrast value 116 may be stored in a threshold contrast memory 122 coupled to the sharpness comparator 120.

The contrast ratio may be calculated as a first ratio of the average of the set of illuminance signal magnitudes from the set of surrounding ISA elements 216 to the magnitude of the illuminance signal from the selected ISA element 210 if the first ratio yields a quotient of greater than or equal to one. Alternatively, the contrast ratio may be calculated as a second ratio of the magnitude of the illuminance signal from the selected ISA element 210 to the average of the set of illuminance signal magnitudes from the set of surrounding ISA elements 216 if the second ratio yields a quotient greater than one.

Some of the unusable ISA element identification techniques described herein may use a minimum scene illumination 123 to achieve a desired level of accuracy. The apparatus 100 may thus include a scene illuminance comparator 124 coupled to the defect detector 112. The scene illuminance comparator 124 may compare an illuminance corresponding to the average of the set of illuminance signal magnitudes from the set of surrounding ISA elements 216 to a threshold illuminance value 126. The apparatus 100 may operate to suppress unusable ISA element identification if the illuminance corresponding to the average of the set of illuminance signal magnitudes from the set of surrounding ISA elements 216 is not greater than the threshold illuminance value 126.

The threshold illuminance value 126 may comprise a constant value associated with a design of the imaging system 105. The threshold illuminance value 126 may have been previously derived by the calibration imaging system 121, as will be discussed below. The threshold illuminance value 126 may be stored in a threshold illuminance memory 130 coupled to the scene illuminance comparator 124.

The apparatus 100 may further include a defect location memory 146 coupled to the defect detector 112. The defect location memory 146 may store a location of the selected ISA element 210 relative to a matrix associated with locations on the ISA 106 if the selected ISA element 210 is identified as unusable. Defect correction logic 150 may be operatively coupled to the defect location memory 146 to adjust a captured image to compensate for the effect of the unusable ISA element on the captured image.

Figure 3:
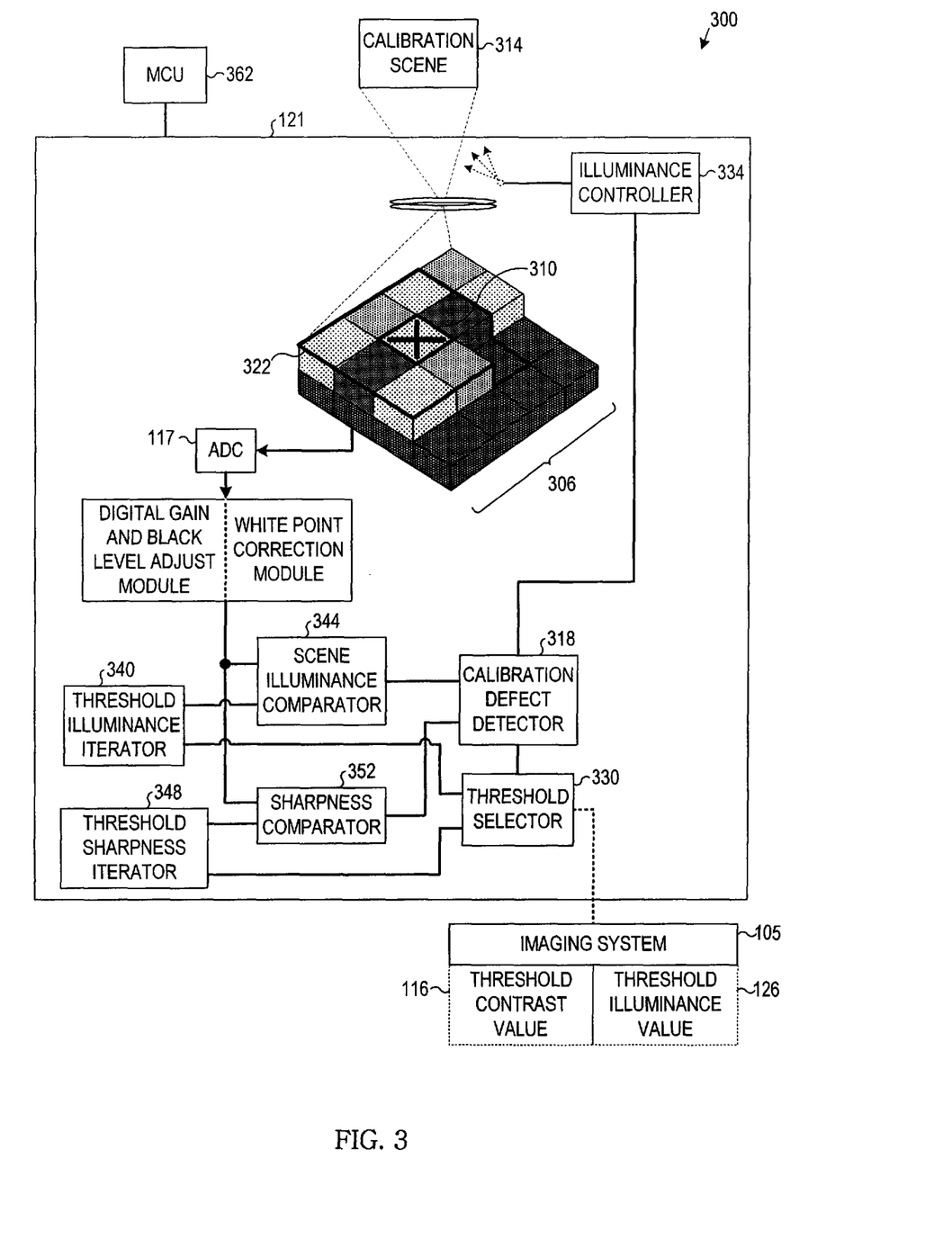
FIG. 3 is a block diagram of a system according to various embodiments of the invention.

FIG. 3 is a block diagram of a representative system 300 according to various embodiments of the invention. The system 300 may include one or more of the apparatus 100. The system 300 may also include the calibration imaging system 121. In some embodiments, the calibration imaging system 121 may comprise a calibration digital camera. A calibration ISA 306 may be associated with the calibration imaging system 121. The calibration ISA 306 may include one or more known unusable calibration ISA elements; and these elements may be present at known locations in the calibration ISA 306. The calibration imaging system 121 may capture one or more series of blurred calibration images of a calibration scene 314 and test one or more calibration ISA elements 310.

The system 300 may also include a calibration defect detector 318 operatively coupled to the calibration ISA 306. The calibration defect detector 318 may identify the calibration ISA element 310 as a candidate unusable element based upon a contrast ratio between the calibration ISA element 310 and a set of surrounding calibration ISA elements 322. The identification may be made, for example, if a calibration contrast ratio calculated from an illuminance indicated by the calibration ISA element 310 and an average illuminance indicated by the set of surrounding calibration ISA elements 322 is greater than a calibration threshold contrast value.

Additionally, unusable ISA element identification may require that the average illuminance indicated by the set of surrounding ISA elements 322 be greater than a calibration threshold illuminance value. The two threshold values, calibration threshold contrast and calibration threshold illuminance, may be iteratively varied in a calibration sequence as discussed below.

A threshold selector 330 may be coupled to the calibration defect detector 318. The threshold selector 330 may select a combination of the calibration threshold illuminance value and the calibration threshold contrast value suitable for reliable identification of the known unusable calibration ISA elements. The combination may be selected using a series of iterative tests to determine that the known unusable calibration ISA elements are reliably identified as unusable and that no other calibration ISA elements are identified as unusable.

The system 300 may also include an illuminance controller 334 coupled to the calibration defect detector 318. The illuminance controller 334 may iteratively vary an average illuminance associated with the calibration scene 314 as the series of blurred calibration images is captured. It is noted that control of the average illuminance associated with the calibration scene 314 as sensed by the ISA 306 may be achieved by setting exposure time to a constant value and varying scene lighting or by maintaining the scene lighting unchanged while varying exposure time.

A threshold illuminance iterator 340 may be coupled to the threshold selector 330. For each iteration of the average illuminance, the threshold illuminance iterator 340 may vary the calibration threshold illuminance value across a dynamic range of the calibration ISA 306 as the series of blurred calibration images is captured.

A scene illuminance comparator 344 may be coupled to the threshold illuminance iterator 340. The scene illuminance comparator 344 may determine whether the average illuminance indicated by the set of surrounding ISA elements 322 is greater than the calibration threshold illuminance value.

The system 300 may also include a threshold sharpness iterator 348 coupled to the threshold selector 330. The threshold sharpness iterator 348 may vary the calibration threshold contrast value across the dynamic range of the calibration ISA 306 for each iteration of the calibration threshold illuminance value as the set of blurred calibration images is captured.

A sharpness comparator 352 may be coupled to the threshold sharpness iterator 348 to calculate the calibration contrast ratio from the calibration scene 314 as imaged by the ISA 306.

The calibration contrast ratio may be calculated as the ratio of the illuminance indicated by the calibration ISA element 310 to the average illuminance indicated by the set of surrounding calibration ISA elements 322. Alternatively, the inverse of the ratio of these two values may be used as the calibration contrast ratio, if greater. The sharpness comparator 352 may also determine whether the calibration contrast ratio is greater than the calibration threshold contrast value.

It is noted that the dynamic range of an ISA (e.g., of the calibration ISA 306) may be represented by a histogram familiar to those of ordinary skill in the art. Brightness levels may range from a value of 0, corresponding to black or zero illuminance, to some greater value corresponding to white or maximum illuminance. The brightness level corresponding to white may be determined by a granularity of ADC conversion of signals generated by ISA elements in the ISA 306. For example, a 10-bit version of an ADC 117 may enable $2^{10}$=1024 brightness levels. The value of 1023 may represent a brightness level corresponding to white. For this example, a contrast ratio of one illuminance value to another can vary from 1/1023 to 1023. Some embodiments herein may limit iterations of the calibration contrast ratio to the dynamic range of the ISA 306, as previously mentioned.

The system 300 may also include a microcontroller unit (MCU) 362 coupled to the calibration imaging system 121. The MCU 362 may comprise an application-specific integrated circuit, a digital signal processor, or both. The MCU 362 may perform system management and control operations.

Given the various arrangements of elements present to this point, one may consider an example of the operation of some of the embodiments disclosed herein. The calibration imaging system 121 may command the illuminance controller 334 to generate a small average illuminance from the calibration scene 314. The threshold illuminance iterator 340 may then set the calibration threshold illuminance variable to a value corresponding to the dark end of the dynamic range of the calibration ISA 306. Next, the threshold sharpness iterator 348 may set the calibration threshold contrast variable to a value corresponding to the dark end of the dynamic range of the calibration ISA 306.

The calibration ISA 306 may then image the calibration scene 314. The scene illuminance comparator 344 may compare the average illuminance indicated by the set of surrounding ISA elements 322 to the value of the calibration threshold illuminance variable. The sharpness comparator 352 may then calculate the calibration contrast ratio as the greater of the illuminance indicated by the calibration ISA element 310 to the average illuminance indicated by the set of surrounding calibration ISA elements 322, or the inverse of the ratio of these two illuminance values.

Consider the case of a darkly defective known unusable calibration ISA element being selected by the calibration imaging system 121 for testing. The sharpness comparator 352 may determine that the calibration contrast ratio is large, because the calibration contrast ratio denominator comprises a small illuminance registered by the darkly defective ISA element. On the other hand, since the illuminance controller 334 initiated the testing scan by dimly illuminating the calibration scene 314, the calibration contrast ratio numerator may also be small. This set of circumstances may result in a calibration contrast ratio that may not meet the criteria for the reliable identification of an unusable calibration ISA element. That is, the calibration contrast ratio may not be larger than the current low iteration of the calibration threshold contrast variable. As the illuminance controller iterates the average calibration scene illuminance through higher values of illuminance, the criteria for reliable defect identification may eventually be met.

The average calibration scene illuminance, the calibration threshold illuminance variable, the calibration threshold contrast variable, and the calibration ISA element 310 selected for testing may each be iterated within successively subordinate loops. At each iteration of each variable, the selected calibration ISA element 310 may be tested using the iterated values to determine whether the selected calibration ISA element 310 is unusable. Those of ordinary skill in the art will appreciate that ranges, increments, and orders of operation may vary from the above-described example while maintaining the substance of the various inventive concepts. Some embodiments may iterate these four variables using hierarchical nests ordered differently than the example. Likewise, some embodiments may iterate the variables over appropriate ranges other than the calibration ISA dynamic range, or in a different order than darkest-to-brightest illuminance values.

Combinations of the calibration threshold illuminance variable and the calibration threshold contrast variable that result in a correct identification of the known unusable calibration ISA elements and that do not result in a mis-identification of a known good calibration ISA element may be selected as candidate threshold values. The smallest of the candidate threshold illuminance values and the candidate threshold contrast values may be chosen as the threshold illuminance value 126 and the threshold contrast value 116, respectively. The latter threshold values may be applicable to imaging systems of similar design as the calibration imaging system 121, and may thus be used in the imaging system 105.

Any of the components previously described may be implemented in a number of ways, including embodiments in software. Software embodiments may be used in a simulation system; and the output of such a system may drive the various apparatus described herein.

Thus, the apparatus 100; the ISA elements 102, 207, 210, 216, 310, 322; the dust particle 104; the imaging systems 105, 121; the ISAs 106, 306; the systems 108, 300; the scenes 206, 314; the lens 209; the defect detectors 112, 318; the threshold values 116, 126; the ADC 117; the digital gain and black level adjustment module 118; the white point correction module 119; the comparators 120, 124, 344, 352; the memories 122, 130, 146; the scene illumination 123; the illuminance value 126; the defect correction logic 150; the threshold selector 330; the illuminance controller 334; the illuminance iterator 340; the sharpness iterator 348; and the MCU 362 may all be characterized as "modules" herein.

The modules may include hardware circuitry, single or multi-processor circuits, memory circuits, software program modules and objects, firmware, and combinations thereof, as desired by the architect of the apparatus 100 and the system 300 and as appropriate for particular implementations of various embodiments.

The apparatus and systems of various embodiments may be useful in applications other than identifying unusable image sensor elements. Thus, various embodiments of the invention are not to be so limited. The illustrations of the apparatus 100 and the system 300 are intended to provide a general understanding of the structure of various embodiments. They are not intended to serve as a complete description of all the elements and features of apparatus and systems that might make use of the structures described herein.

The novel apparatus and systems of various embodiments may comprise and/or be included in electronic circuitry used in high-speed computers, communication and signal processing circuitry, single or multi-processor modules, single or multiple embedded processors, multi-core processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

Figure 4:
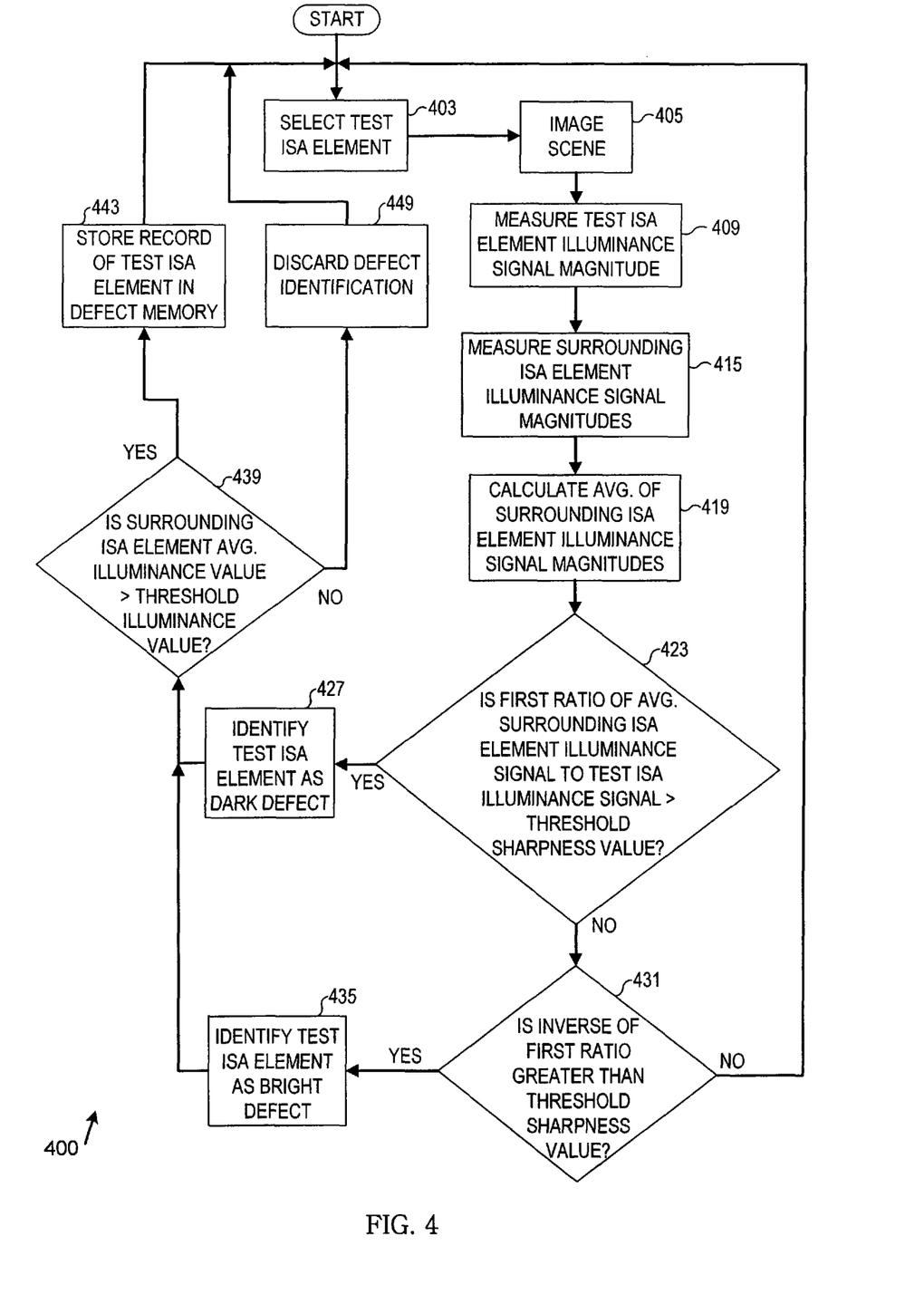
FIG. 4 is a flow diagram illustrating several methods according to various embodiments of the invention.

FIG. 4 is a flow diagram illustrating several methods according to various embodiments of the invention. In some embodiments, a method 400 may operate to analyze a blurred image of an imaged scene and use image sharpness to identify an unusable ISA element associated with an ISA in an imaging system. The contrast between an illuminance indicated by an ISA element selected for testing and an average illuminance indicated by a set of ISA elements surrounding the selected ISA element ("surrounding ISA elements") may be used as a measure of sharpness.

In some embodiments, the set of surrounding ISA elements may be immediately adjacent to the selected ISA element; however other configurations are possible, as described above. In some embodiments, the production imaging system may be configured as a digital camera. Unusable ISA element identification may occur during normal operation of an imaging system that employs some of the embodiments described herein.

The method 400 may commence at block 403 with selecting a test ISA element in an imaging system. The method 400 may continue at block 405 with imaging a scene with the imaging system using an image blurring technique. Various image blurring techniques may be used, including defocusing a lens associated with the imaging system. Other techniques may include facilitating blurring caused by camera movement by increasing exposure time while optionally reducing lens aperture. For example, a camera phone may experience a substantial handshake. Blurring effects of the handshake may be amplified by increasing exposure time (e.g., to one second), and optionally reducing the lens aperture to avoid overexposure. Any image stabilization technique normally operating in the camera may be disabled during this activity.

The method 400 may include measuring the magnitude of an illuminance signal from the ISA element to be tested, at block 409. An illuminance signal magnitude from each of the set of surrounding ISA elements may be measured at block 415. The method 400 may also include calculating an average of the set of illuminance signal magnitudes from the set of surrounding ISA elements at block 419.

The method 400 may continue at block 423 with testing whether a first ratio of the average of the set of illuminance signal magnitudes from the set of surrounding ISA elements to the magnitude of the illuminance signal from the ISA element is greater than a threshold sharpness value. If so, the ISA element to be tested may be identified as a dark defect element, at block 427.

If the first ratio is not greater than the threshold sharpness value, the method 400 may continue at block 431 with determining whether an inverse of the first ratio of the magnitude of the illuminance signal from the ISA element to the average of the set of illuminance signal magnitudes from the set of surrounding ISA elements is greater than the threshold sharpness value. If so, the method 400 may identify the ISA element as a bright defect element, at block 435. If the inverse ratio is not greater than the threshold sharpness value, testing of the ISA element may terminate and additional ISA elements may be selected and tested, beginning at block 403.

The scene illumination available may be so low as to be inadequate to produce sufficient contrast for reliable defect identification using contrast-dependent methods represented by the method 400. An average illuminance value associated with the set of surrounding ISA elements may correspond to the average of the set of illuminance signal magnitudes from the set of surrounding ISA elements. To more consistently provide adequate scene illumination for reliable identification, the method 400 may also include determining whether the average illuminance value associated with the set of surrounding ISA elements is greater than a threshold illuminance value, at block 439. If so, the method 400 may continue with storing a record of the identified unusable ISA element in a defect memory, at block 443. If the surrounding ISA element average illuminance value is not greater than the threshold illuminance value, testing of the ISA element may terminate with discarding the unusable ISA element identification, at block 449. Additional ISA elements may be selected and tested, beginning at block 403.

Figure 5A:
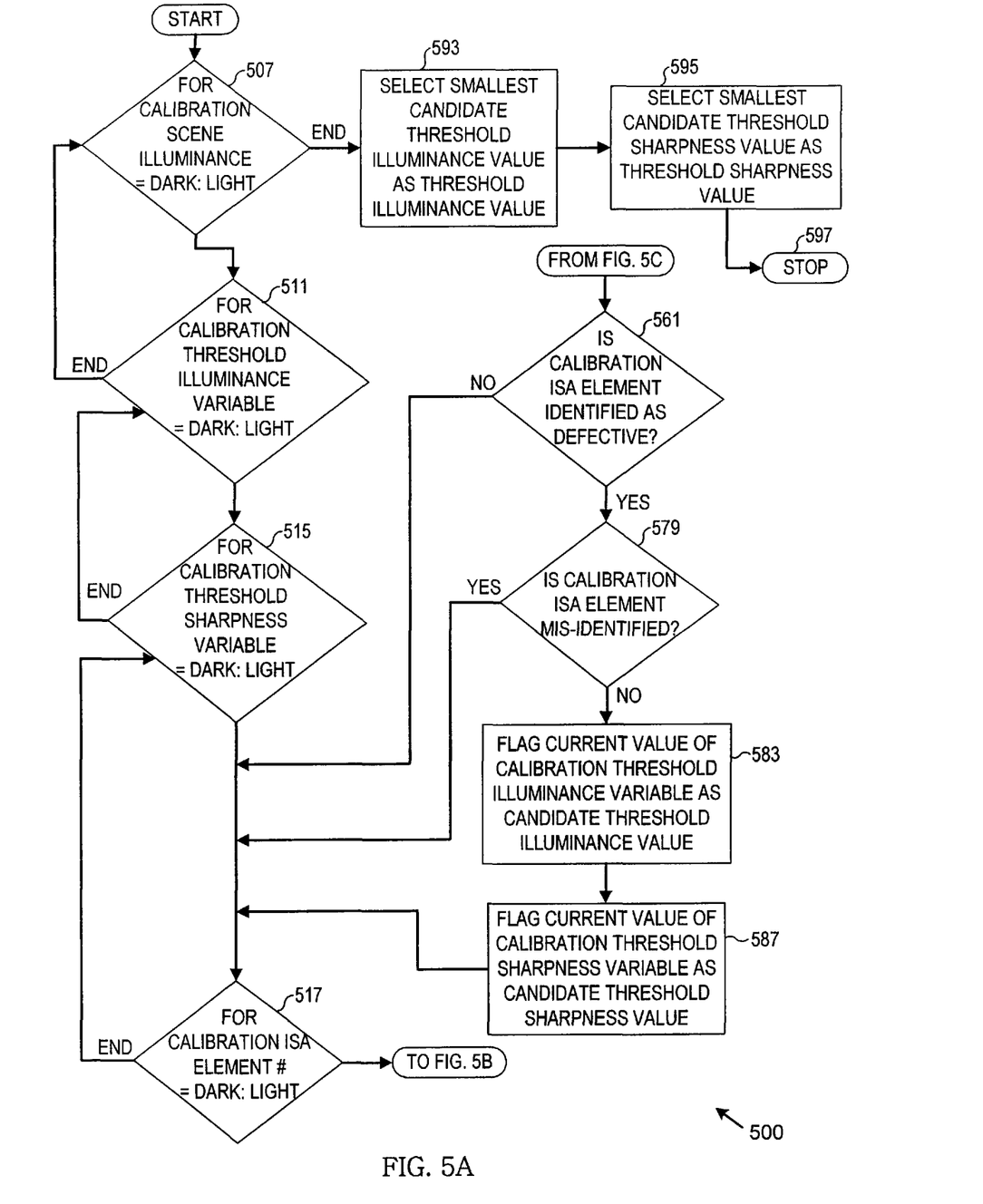
FIG. 5A, FIG. 5B, and FIG. 5C are flow diagrams illustrating several calibration methods according to various embodiments of the invention.
Figure 5B:
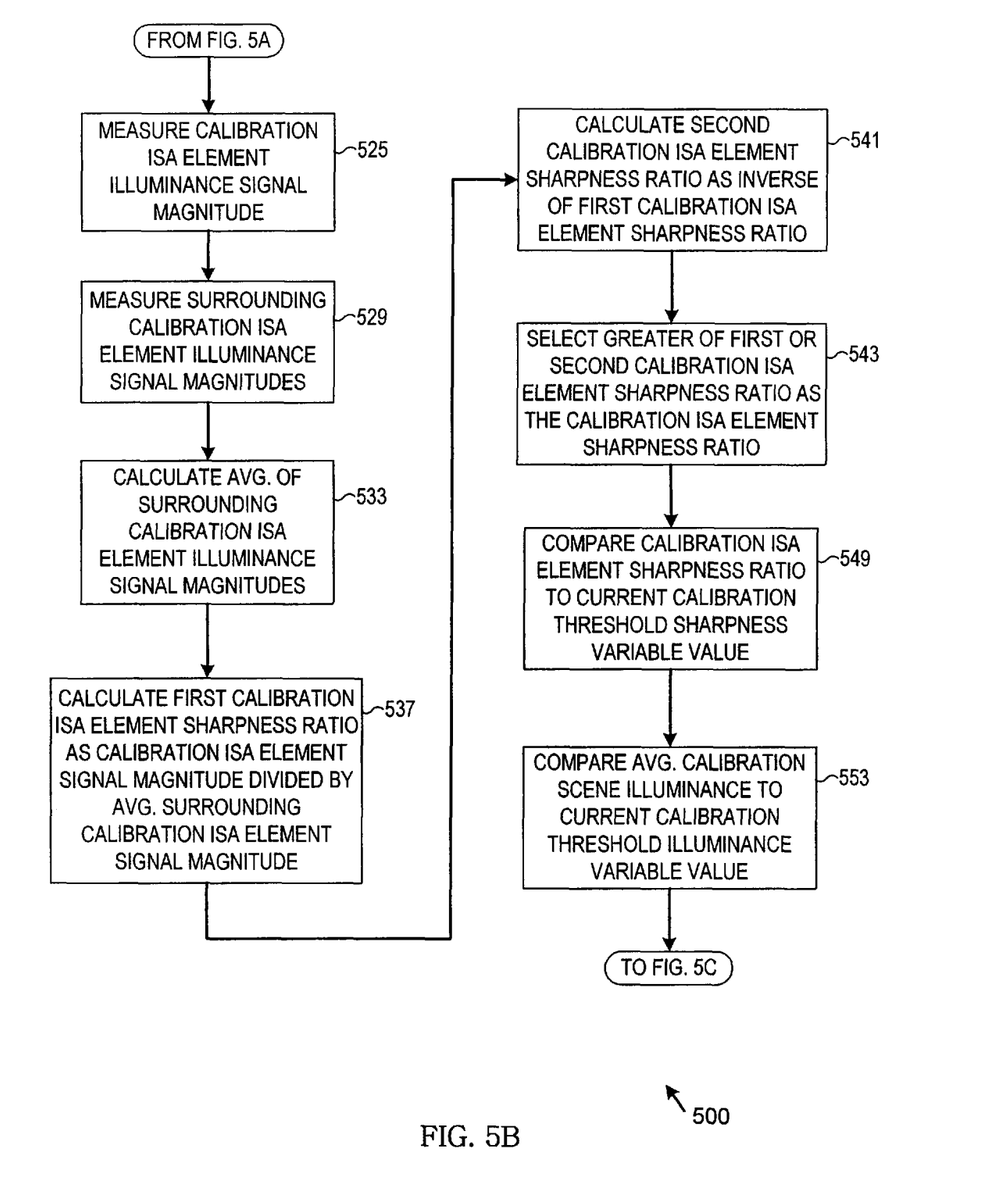
Figure 5C:
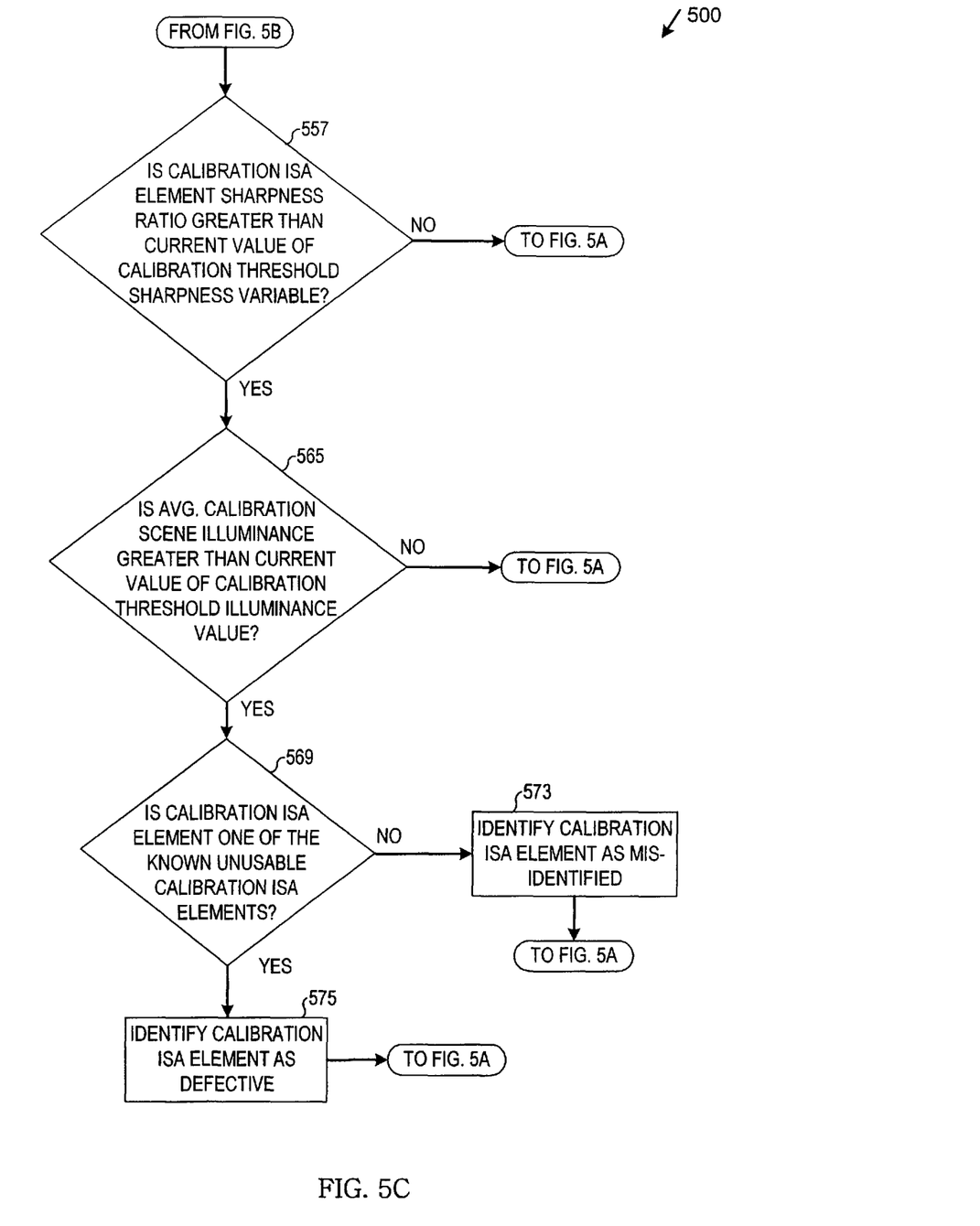

FIGS. 5A, 5B, and 5C are flow diagrams illustrating several calibration methods according to various embodiments of the invention. In some embodiments, a method 500 may use a calibration imaging system to determine the threshold illuminance value and the threshold sharpness value, both used for identification of unusable ISA elements in the method 400 described above. The method 500 may include repeatedly imaging a calibration scene using an image blurring technique and attempting to correctly identify one or more known unusable calibration ISA elements present at known locations in a calibration ISA associated with the calibration imaging system.

The method 500 may iterate the threshold illuminance value and the threshold sharpness value and test elements of the calibration ISA at each iteration. The method 500 may select a combination of these values such that the known unusable calibration ISA elements are reliably detected. The known unusable calibration ISA elements may be classified as calibration dark defect elements, calibration bright defect elements, or a combination thereof.

The method 500 may execute a series of nested looping activities to test various combinations of calibration scene illuminance values, threshold calibration illuminance values, and threshold calibration sharpness values, and to scan through a matrix of calibration ISA elements associated with the calibration ISA.

The method 500 may commence with iteratively varying an average calibration illuminance associated with the calibration scene as measured by the calibration imaging system at block 507. For each iteration of the average calibration illuminance, the method 500 may iterate a calibration threshold illuminance variable at block 511. For each iteration of the calibration threshold illuminance variable, the method 500 may iterate a calibration threshold sharpness variable at block 515.

For each iteration of the calibration threshold sharpness variable, the method 500 may scan through the matrix of calibration ISA elements at block 517. The method 500 may perform a calibration sharpness test on a calibration ISA element selected for testing by the iteration block 517. The average illuminance associated with the calibration scene, the calibration threshold illuminance variable, and/or the calibration threshold sharpness variable may be iterated through a range corresponding to a dynamic range of the calibration ISA. Those of ordinary skill in the art will appreciate that ranges, increments, and orders of operation may vary from the above-described example while maintaining the substance of the various inventive concepts.

Turning now to FIG. 5B, it can be seen that the method 500 may continue at block 525 with measuring a magnitude of an illuminance signal from the selected calibration ISA element. The method 500 may also include measuring a magnitude of an illuminance signal from each one of a set of calibration ISA elements surrounding the selected calibration ISA element, at block 529. The surrounding calibration ISA elements may lie immediately adjacent to the selected calibration ISA element, or may lie in some other physical relationship with the selected calibration ISA element. The method 500 may further include calculating an average of the set of calibration illuminance signal magnitudes from the set of calibration ISA elements surrounding the selected calibration ISA element, at block 533.

The method 500 may include calculating a first calibration ISA element sharpness ratio as the magnitude of the calibration illuminance signal from the selected calibration ISA element divided by the average of the set of calibration illuminance signal magnitudes from the set of calibration ISA elements surrounding the selected calibration ISA element at block 537.

The method 500 may also include calculating a second calibration ISA element sharpness ratio as the average of the set of illuminance signal magnitudes from the set of calibration ISA elements surrounding the selected calibration ISA element divided by the magnitude of the illuminance signal from the selected calibration ISA element, at block 541. The method 500 may further include selecting the greater of the first or second calibration ISA element sharpness ratio as the calibration ISA element sharpness ratio at block 543.

The method 500 may continue at block 549 with comparing the calibration ISA element sharpness ratio to the current calibration threshold sharpness variable value at block 549. The method 500 may also include comparing the average illuminance associated with the calibration scene to the current calibration threshold illuminance variable value at block 553.

Turning now to FIG. 5C, it can be seen that the method 500 may test to determine whether the calibration ISA element sharpness ratio is greater than the current value of the calibration threshold sharpness variable at block 557. If not, the method 500 may continue at block 561 of FIG. 5A. If the calibration ISA element sharpness ratio is greater than the current value of the calibration threshold sharpness variable, the method 500 may continue at block 565.

At block 565, the method 500 may test to determine whether the average scene illuminance is greater than the current value of the calibration threshold illuminance variable. If not, the method 500 may continue at block 561 of FIG. 5A. If the average scene illuminance is greater than the current value of the calibration threshold illuminance variable, the method 500 may continue at block 569.

At block 569, the method 500 may test to determine whether the calibration ISA element being tested is one of the known unusable calibration ISA elements. If not, the method 500 may identify the selected calibration ISA element as mis-identified at block 573. The method 500 may then continue at block 561 of FIG. 5A. If the calibration ISA element being tested is one of the known unusable calibration ISA elements, the method 500 may identify the selected calibration ISA element as defective at block 575. The method 500 may then continue at block 561 of FIG. 5A.

Turning back to FIG. 5A, the method 500 may continue at block 561 with testing to determine whether the selected calibration ISA element was identified as defective. If not, the method 500 may return to block 517 to select a next calibration ISA element to test. If the selected calibration ISA element was identified as defective, the method 500 may continue with testing whether the selected calibration ISA element was mis-identified at block 579. If so, the method 500 may return to block 517 to select a next calibration ISA element to test.

If the selected calibration ISA element was not mis-identified, the method 500 may continue at block 583 with flagging the current value of the calibration threshold illuminance variable as a candidate threshold illuminance value. The method 500 may also flag the current value of the calibration threshold sharpness variable as a candidate threshold sharpness value at block 587. The method 500 may then continue at block 517. Some embodiments may delete a candidate threshold illuminance value and a candidate threshold sharpness value as candidates if one or more known defective ISA elements are not correctly identified as defective by the method 500 using these threshold values.

The method 500 may perform calibration ISA element sharpness testing on the one or more selected calibration ISA elements associated with the calibration ISA for various combinations of the calibration threshold sharpness variable, the calibration threshold illuminance variable, and the calibration scene illuminance. Each time a selected calibration ISA element is identified as defective and not as mis-identified, the method 500 may flag the calibration threshold variables as candidate threshold values. In some embodiments, the nested series of iterative loops may end at block 593.

The method 500 may continue at block 593 with selecting a smallest candidate threshold illuminance value from the various candidate threshold values that may have been identified. The smallest candidate threshold illuminance value may be selected as the threshold illuminance value. The method 500 may also include selecting a smallest candidate threshold sharpness value as the threshold sharpness value at block 595. The threshold illuminance value and the threshold sharpness value may be used in the method 400, above. The method 500 may terminate at block 597.

It should be noted that the activities described herein may be executed in an order other than the order described. The various activities described with respect to the methods identified herein may also be executed in repetitive, serial, and/or parallel fashion.

A software program may be launched from a computer-readable medium in a computer-based system to execute functions defined in the software program. Various programming languages may be employed to create software programs designed to implement and perform the methods disclosed herein. The programs may be structured in an object-oriented format using an object-oriented language such as Java or C++. Alternatively, the programs may be structured in a procedure-oriented format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

Implementing the apparatus, systems, and methods disclosed herein may operate to identify unusable ISA elements in an imaging system during normal operation following manufacturing, using minimal memory and logic resources. The identification and remediation of the unusable elements may increase customer satisfaction by increasing image quality. Product costs may also be reduced as the number of defective product returns decreases.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A system comprising:
   a calibration imaging system to capture a plurality of blurred calibration images of a calibration scene, wherein at least one known unusable calibration image sensor array (ISA) element is present at a known location in a calibration ISA associated with the calibration imaging system;
   a calibration defect detector operatively coupled to the calibration ISA to identify a calibration ISA element as a candidate unusable element if a calibration contrast ratio calculated from an illuminance indicated by the calibration ISA element and an average illuminance indicated by a set of surrounding calibration ISA elements is greater than a calibration threshold contrast value, and the average illuminance indicated by the set of surrounding ISA elements is greater than a calibration threshold illuminance value;
   a threshold selector coupled to the calibration defect detector to select a combination of the calibration threshold illuminance value and the calibration threshold contrast value such that the at least one known unusable calibration ISA element is reliably identified as unusable and no other calibration ISA elements are identified as unusable;

an illuminance controller coupled to the calibration defect detector to iteratively vary an illuminance associated with the calibration scene as ones of the plurality of blurred calibration images are captured;

a threshold illuminance iterator coupled to the threshold selector to iteratively vary the calibration threshold illuminance value across a dynamic range of the calibration ISA for each iteration of the average illuminance associated with the calibration scene as the ones of the plurality of blurred calibration images are captured; and a threshold sharpness iterator coupled to the threshold selector to vary the calibration threshold contrast value across the dynamic range of the calibration ISA for each iteration of the calibration threshold illuminance value as the ones of the plurality of blurred calibration images are captured.

2. The system of claim 1, further comprising:
a microcontroller unit (MCU) coupled to the calibration imaging system to perform system management and control operations, wherein the MCU comprises at least one of an application-specific integrated circuit or a digital signal processor.

3. The system of claim 1, further comprising:
a scene illuminance comparator coupled to the threshold illuminance iterator to determine whether the average illuminance indicated by the set of surrounding calibration ISA elements is greater than the calibration threshold illuminance value.

4. The system of claim 1, further comprising:
a sharpness comparator coupled to the threshold sharpness iterator to calculate the calibration contrast ratio as the greater of the illuminance indicated by the calibration ISA element to the average illuminance indicated by the set of surrounding calibration ISA elements and the average illuminance indicated by the set of surrounding calibration ISA elements to the illuminance indicated by the calibration ISA element, and to determine whether the calibration contrast ratio is greater than the calibration threshold contrast value.

5. The system of claim 1, wherein the calibration imaging system comprises a calibration digital camera.

6. The system of claim 1, further comprising a digital camera coupled to the calibration imaging system.

7. A method comprising:
capturing a plurality of blurred calibration images of a calibration scene, wherein at least one known unusable calibration image sensor array (ISA) element is present at a known location in a calibration ISA associated with the calibration imaging system;

identifying a calibration ISA element as a candidate unusable element if a calibration contrast ratio calculated from an illuminance indicated by the calibration ISA element and an average illuminance indicated by a set of surrounding calibration ISA elements is greater than a calibration threshold contrast value, and the average illuminance indicated by the set of surrounding ISA elements is greater than a calibration threshold illuminance value;

selecting a combination of the calibration threshold illuminance value and the calibration threshold contrast value such that the at least one known unusable calibration ISA element is reliably identified as unusable and no other calibration ISA elements are identified as unusable;

iteratively varying an illuminance associated with the calibration scene as ones of the plurality of blurred calibration images are captured;

iterating a calibration threshold illuminance variable for each iteration of the average calibration illuminance associated with the calibration scene; and iterating a calibration threshold sharpness variable for each iteration of the calibration threshold illuminance variable.

8. The method of claim 7, wherein iteratively varying an illuminance associated with the calibration scene includes iteratively varying an average calibration illuminance associated with the calibration scene.

9. The method of claim 7, further comprising:
performing a calibration sharpness test on each calibration ISA element in the calibration ISA associated with the calibration imaging system for each iteration of the calibration threshold sharpness variable.

10. The method of claim 9, further comprising:
flagging values of the calibration threshold illuminance variable as candidate threshold illuminance values and flagging values of the calibration threshold sharpness variable as candidate threshold sharpness values if the calibration sharpness test performed on the each calibration ISA element in the calibration ISA identifies the each calibration ISA element as defective and not as mis-identified.

11. The method of claim 10, further comprising:
selecting a smallest candidate threshold illuminance value as the threshold illuminance value.

12. The method of claim 11, further comprising:
selecting a smallest candidate threshold sharpness value as the threshold sharpness value.

13. The method of claim 9, wherein the calibration sharpness test comprises:
calculating a calibration ISA element sharpness ratio;
comparing the calibration ISA element sharpness ratio to the calibration threshold sharpness variable,
comparing the average illuminance associated with the calibration scene to the calibration threshold illuminance variable.

14. The method of claim 13, further comprising:
identifying the each calibration ISA element in the calibration ISA as defective if the calibration ISA element sharpness ratio is greater than the calibration threshold sharpness variable, if the average illuminance associated with the calibration scene is greater than the calibration threshold illuminance variable, and if the each calibration ISA element in the calibration ISA is the at least one known unusable calibration ISA element.

15. The method of claim 13, further comprising:
identifying the each calibration ISA element as mis-identified if the calibration ISA element sharpness ratio is greater than the calibration threshold sharpness variable, if the average illuminance associated with the calibration scene is greater than the calibration threshold illuminance variable, and if the each calibration ISA element is not the at least one known unusable calibration ISA element.

16. The method of claim 7, wherein an iteration range of at least one of the average illuminance associated with the calibration scene, the calibration threshold illuminance variable, or the calibration threshold sharpness variable corresponds to a dynamic range of the calibration ISA.

\* \* \* \* \*